United States Patent Office 3,773,746
Patented Nov. 20, 1973

3,773,746
1,1'-AZO BIS(1H-IMIDAZO(1,2-a) PYRIDINIUM DIBROMIDE COMPOUNDS
David Jack, London, and Ernest Edward Glover, Middlesbrough, England, assignors to Allen & Hanburys Limited, London, England
No Drawing. Filed May 13, 1971, Ser. No. 143,210
Claims priority, application Great Britain, June 3, 1970, 26,812/70
Int. Cl. A61l 27/00; C07c 115/00
U.S. Cl. 260—140                             13 Claims

ABSTRACT OF THE DISCLOSURE

There are provided compounds of the general formula

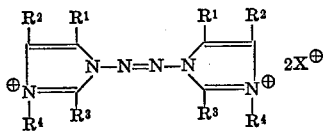

in which $R^1$–$R^4$ which may be the same or different represent lower alkyl, lower alkenyl, halogen, aralkyl or aryl in which the aryl group may be substituted with hydroxy, lower alkoxy, halogen, nitro or trifluoromethyl and in which any two adjacent groups R may together with 2 atoms of the imidazole ring form a 5, 6 or 7 membered carbocyclic or heterocyclic ring; and X represents a physiologically acceptable anion.

These compounds have a curare like neuromuscular blocking action.

---

This invention relates to novel imidazolium salts and to pharmaceutical compositions containing the same.

We have found that certain imidazolium salts which are new, have an interesting pharmacological activity and in particular have a curare like neuromuscular blocking action and may therefore be used to produce relaxation during anaesthesis or to prevent convulsions in electroconvulsive therapy.

These compounds are found to have several advantageous properties including being rapid in onset, having a shorter action than α-tubocurarine, and not producing the idiosyncratic responses in patients suffering from cholinesterase deficiencies that can accompany the use of succinyl choline, nor the cardiovascular responses associated with α-tubocurarine.

The present invention provides imidazolium derivatives of the General Formula I:

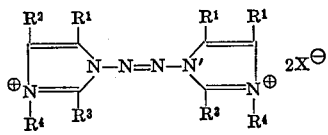

(I)

in which $R^1$–$R^4$ may be the same or different, are lower alkyl (1–6 carbon atoms) lower alkenyl (2–6 carbon atoms), halogen, aralkyl or aryl. The aryl group may optionally be substituted by hydroxy, lower alkoxy, halogen, nitro or trifluoromethyl, or in which any two adjacent groups R together with two atoms of the imidazole ring, form a 5, 6 or 7 membered carbocyclic or heterocyclic ring, and X may be any physiologically aceptable anion such as bromide, chloride, acetate, phosphate, perchlorate or picrate.

Preferred compounds are those in which $R^1$ and $R^2$ represent hydrogen, alkyl containing 1–3 carbon atoms, halogen, phenyl or halophenyl and $R^3$ and $R^4$ together with the atoms of the imidazole ring form a pyridinium or tetrahydropyridinium group.

The invention also provides pharmaceutical compositions which contain a salt of General Formula I, together with a pharmaceutically acceptable carrier. The most usual means of administering neuromuscular blocking agents is by intravenous injection, although other parenteral routes may sometimes be used. Injections may be formulated with the aid of physiologically acceptable carriers and agents as solutions, suspensions or as dry products for reconstitution before use.

A suitable single injectable dosage range is about 2 to 100 mgs. but continuous infusion or repeated injections may be needed for long operations.

The compounds of the invention possess a short lasting curare-like neuromuscular blocking action. The desirability of a short acting muscle relaxant is well known. For long operations an adequate level of relaxation can be obtained by continuous intravenous drip, thereby giving the anaesthetist a greater control of the degree of relaxation and also allowing a rapid return to spontaneous movement when the infusion is stopped. The short acting muscle relaxants at present in use are of the depolarising type and have several disadvantages. Post-operative pain constitutes one of the major disadvantages in the use of succinylcholine. Its occurrence is associated with depolarisation and may be a consequence of the muscle fasciculations which occur during onset. Other disadvantages are the lack of a suitable antagonist and the possibility of prolonged apnoea.

A preferred compound of the invention is 1,1¹-azobis-[3-methyl - 2 - phenyl - 1H - imidazo[1,2-a]pyridinium] dibromide of Example 4.

Equipotent neuromuscular blocking doses of succinylcholine and 1,1¹-azobis[3-methyl-2-phenyl-1H-imidazo-[1,2-a]pyridinium]dibromide have similar durations of activity in the anaesthetized cat but what is particularly striking is the rapid recovery from blockade with the compound of the present invention even when the drug has been infused for long periods of time. The neuromuscular blocking activity of some compounds of our invention in the cat art summarised in the table below.

Cat sciatic nerve-tibialis muscle preparation. 80–100% inhibition, mg./kg.

| | |
|---|---|
| 1,1¹ - azobis[2 - phenyl - 1H - imidazo[1,2 -a ] pyridinium]dibromide of Example 2 | 0.2–0.5 |
| 1,1¹ - azobis[3 - methyl - 2 - phenyl - 1H-imidazo[1,2-a]pyridinium]dibromide of Example 4 | 0.1–0.2 |
| Succinylcholine | 0.04–0.08 |
| (+)-tubocurarine | 0.1–0.4 |

Specific preferred compounds according to the invention are those described in the examples.

The compounds according to the invention may be prepared by a number of processes. The basis of most of the methods is the treatment of the amine of General Formula II in which $R^1$–$R^4$ and X have the meanings given above with a suitable oxidizing agent e.g. bromine or chlorine.

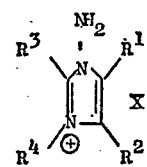

(II)

The reaction is preferably effected in a solvent such as, for example, water or ethanol below 10° C. e.g. 0° C.

The invention therefore provides a process for the preparation of compounds of Formula I according to the invention which comprises subjecting a compound of Formula II to oxidation to link two molecules of the compound of Formula II together through an azo group.

The amine II may be prepared by standard routes which include, but are not limited to, the following:

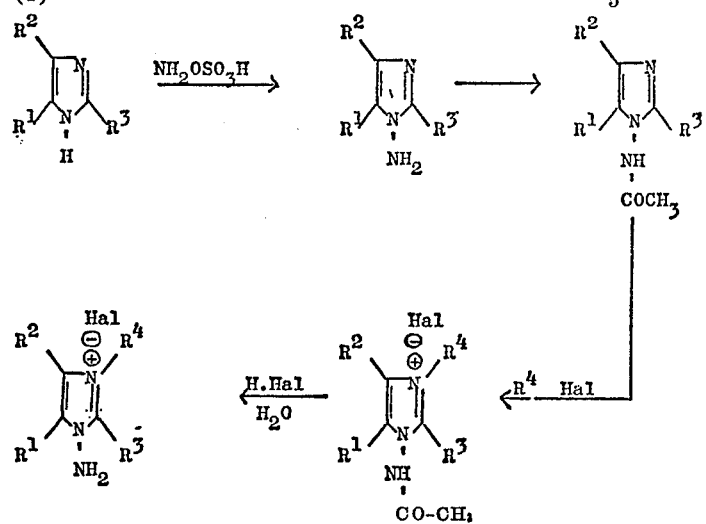

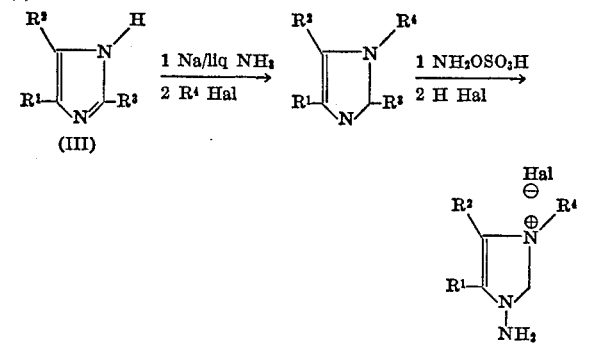

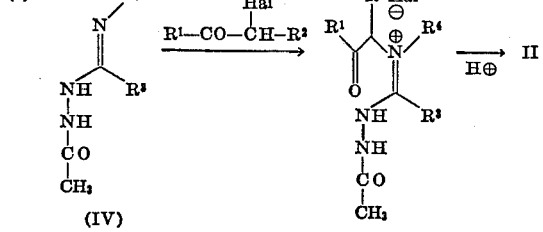

(IV)

The imidazole III and the hydrazamidine IV may be prepared by any of the numerous routes known to those skilled in the art.

The nature of the $R^1$–$R^4$ may result from using starting materials containing appropriate groups or they may be changed after the preparation of the compound of Formula I by a reaction such as that indicated below to convert $R^2$=H into $R^2$=Br.

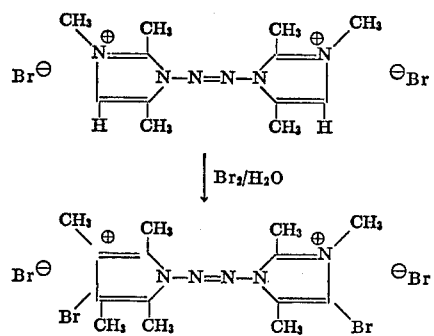

Also the amine of Formula II may be subjected to a reaction to change the nature of the groups $R^1$–$R^4$. Thus when $R^3$ and $R^4$ together with two atoms of the imidazole ring represent a pyridine ring the latter may be converted into a tetrahydropyridine ring by hydrogenation with a platinum catalyst.

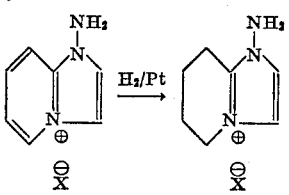

The following examples illustrate the invention:

EXAMPLE 1

1,1¹-azobis[1H-imidazo[1,2-a]pyridinium]dibromide (a) 2-(2 - acetylhydrazino)pyridine.—2 - hydrazinopyridine (1.5 g.) was treated with a mixture of pyridine (6 ml.) and acetic anhydride (1.5 ml.) and the solution allowed to stand for ¾ hour. The acetylating mixture was then removed under reduced pressure and the residue washed with dry ether giving the colourless monoacetyl derivatives (1.625 g.) M.P. 150–154°. The melting point was unchanged after recrystallization from benzene.

(b) 2 - (2 - acetylhydrazino) - 1 - formylmethyl pyridinium bromide.—A solution of 2-(2-acetylhydrazino)-pyridine (0.73 g.) in methanol (2.5 ml.) was treated with freshly distilled bromoacetaldehyde (0.825 g.) and the mixture allowed to stand overnight. The mixture was then warmed on a water bath and dry ether added into incipient precipitation. The *bromide* (1.165 g.), separated on cooling and crystallized from ethanol-ether as colourless prisms, M.P. 191°. The *picrate* crystallized from ethanol-ether as yellow needles, M.P. 151°.

(c) 1 - aminoimidazo(1,2-a)pyridinium bromide.—A solution of the monoquaternary salt prepared in (b) (1.63 g.) in 24% hydrobromic acid (10 ml.) was boiled under reflux for 1 hour. The solution was evaporated to dryness under reduced pressure and the residual *bromide* was recrystallized from ethanol-ether giving pale yellow prisms, M.P. 163–164° (1.19 g.). The *picrate* crystallized from water as yellow needles, M.P. 165°.

(d) 1,1¹ - azobis[1H - imidazo[1,2-a]pyridinium]dibromide.—Ice-cold saturated bromine water (7 ml.) was added to an ice cold solution of 1-aminoimidazo(1,2-a)-pyridinium bromide (0.06 g.) in water (0.5 ml.). The yellow-orange solid which immediately precipitated was filtered off and washed with a little ice-cold water. It was then boiled in anhydrous acetone (2 ml.) until the solid became pale yellow in colour; a little more acetone was then added to ensure complete precipitation. The pale yellow *dibromide* (0.03 g.), recrystallized from hydrobromic acid (48%)—methanol giving the monohydrate as yellow prisms, M.P. 309° (decomp.). The *diperchlorate* crystallized from water as the monohydrate, M.P. 290°. The *dipicrate* crystallized from nitromethane as yellow needles, M.P. 279°.

EXAMPLE 2

1,1¹-azobis[2-phenyl-1H-imidazo[1,2-a]pyridinium] dibromide (a) 2-(2-acetylhydrazino)-1-phenacyl pyridinium bromide.—A solution of 2-(2-acetylhydrazino)pyrimidine (0.3 g.) and phenacylbromide (0.4 g.) in acetone (5 ml.) was boiled under reflux for 5½ hours after which time it was cooled and filtered. The colourless *bromide* (0.52 g.) crystallized from ethanol-ether as colourless prisms, M.P. 171°. The *picrate* crystallized from nitromethane as yellow needles, M.P. 115°.

(b) 1 - amino-2-phenylimidazo(1,2-a)pyridinium bromide.—A solution of the monoquaternary salt as prepared in (a) above (0.19 g.) in 24% hydrobromic acid (2 ml.) was boiled under reflux for 1 hour. The solution was cooled and the *bromide* (0.15 g.) was filtered off. Recrystallization from ethanol-ether gave the monohydrate as colourless needles, M.P. 177–179°. The *picrate* crystallized from water as yellow needles, M.P. 158–162°.

(c) 1,1¹-azobis[2-phenyl - 1H - imidazo[1,2-a]pyridinium]dibromide.—Saturated bromine water (7 ml.) was added to a solution of 1-amino-2-phenylimidazo(1,2-a)-pyridinium bromide (0.06 g.) in water (0.05 ml.). The orange-red solid which precipitated was filtered washed with a little ice-cold water and boiled for 2 minutes in anhydrous acetone (2 ml.). After the addition of a little more acetone to ensure complete precipitation the *dibromide* (0.037 g.) was filtered off and recrystallized from methanol-ether giving yellow prisms, M.P. 253–255° (decomp.). The *dipicrate* crystallized from nitromethane as yellow prisms, M.P. 205° (decomp.).

EXAMPLE 3

1,1¹-azobis[3-bromo-2-methyl-1H-imidazo[1,2-a]pyridinium]dibromide (a) 1 - acetonyl-2-(2-acetylhydrazino)pyridinium bromide.—A solution of 2-(2-acetylhydrazino)pyridine (0.3 g.) and bromoacetone (0.275 g.) in absolute alcohol (5 ml.) was boiled under reflux for 5 hours. The solution was cooled, ether added to initiate precipitation and the solution stood overnight in a refrigerator. The separating *bromide* (0.35 g.) was filtered off. Recrystallization from nitromethane-ether gave an amorphous solid, M.P. 167–168°. The *picrate* crystallized from water as yellow prisms, M.P. 200–202°.

(b) 1 - amino-2-methylimidazo(1,2-a)pyridinium bromide.—A solution of the monoquaternary salt as prepared in (a) above (0.225 g.) in 24% hydrobromic acid (4 ml.) was boiled under reflux for 1 hour. The solution was evaporated to dryness under reduced pressure and the residue was dissolved in methanol. The *bromide* (0.16 g.) was precipitated by the addition of ether and recrystallized from ethanol-ether as colourless needles, M.P. 224–225°. The *picrate* crystallized from ethanol as yellow prisms, M.P. 145–146°.

(c) 1,1¹-azobis-3-bromo-2-methyl-1H - imidazo[1,2-a]pyridinium dibromide.—Ice cold saturated bromine water (7 ml.) was added to a solution of 1-amino-2-methyl-imidazo(1,2-a)pyridinium bromide (0.06 g.) in water (0.5 ml.) and the precipitated yellow-orange solid filtered off and washed with a little ice-cold water. The solid was then boiled in anhydrous acetone (2 ml.) until its colour changed to pale yellow. After the addition of a little more acetone the *dibromide* (0.033 g.) was filtered off and recrystallized from methanol giving yellow needles, M.P. 257°. The *dipicrate* crystallized from water as orange-yellow plates, M.P. 207°.

EXAMPLE 4

1,1¹-azobis[3-methyl-2-phenyl-1H-imidazo[1,2-a]pyridinium]dibromide (a) 1 - acetamido - 3 - methyl - 2 - phenylimidazo-[1,2-a]pyridinium bromide.—A mixture of 2-(2-acetylhydrazino)pyridine (2 g.) and 2-bromopropiophenone (2.84 g.), in ethanol (10 ml.) was heated in an open flask in a bath at 160–170° until the ethanol had evaporated; the residual melt was then heated for a further 0.25 h. After cooling, the residual gum was triturated with acetone and the resulting solid (2.8 g.) recrystallized from ethanol-ether giving the *bromide* as colourless prisms, M.P. 232–234°.

(b) 1 - amino - 3 - methyl - 2 - phenylimidazo[1,2-a]pyridinium bromide.—A solution of the acetamido compound (2.78 g.) in 24% hydrobromic acid (12 ml.) was boiled under reflux for 1 h. The solution was then evaporated under reduced pressure and the residue dissolved in methanol. Addition of ether precipitated the *bromide* which crystallized from ethanol as colourless prisms, M.P. 243–244° (1.7 g.).

(c) 1,1¹ - azobis[3 - methyl - 2 - phenyl - 1H - imidazo[1,2-a]pyridinium]dibromide.—A warm (50°) solution of the N-amino compound (0.6 g.) in water (10 ml.) was treated with saturated bromine water (70 ml.) and the precipitated orange solid filtered off and washed with water. The orange solid was sucked dry and then boiled with acetone (30 ml.) until the suspended solid became yellow. Absolute acetone (10 ml.) was then added and the solution filtered giving the *dibromide* (0.57 g.) which crystallized from water as the yellow dihydrate, M.P. 215–219° (softened at 196°). Tre *dipicrate* crystallized from nitromethane-ether as yellow prisms, M.P. 189–191° (decomp). 1,1¹ - azobis[3 - methyl-2-phenyl-1H-imidazo-[1,2-a]pyridinium]dibromide may also be prepared as follows:

(a) 1 - acetamido - 3 - methyl - 2 - phenylimidazo(1,2-a)pyridinium bromide.—2 - (2 - acetylhydrazino)pyridine (4.4 g.) 2-bromopropiophenone (6.0 g.) were heated and stirred in nitrobenzene (40 ml.) at 90° for 3 days. The solution was then cooled and ether (200 ml) was added to precipitate a brown gum. After triturating with more ether this was crystallized from ethanol/ethyl acetate to give a white crystalline solid (3.5 g.) M.P. 228–30°.

(b) 1 - amino - 3 - methyl - 2 - phenylimidazo(1,2 - a) pyridinium bromide.—The acetamido compound (3.5 g.) was heated at reflux in 25% aqueous hydrobromic acid for 4 hrs. The solution was then evaporated to dryness in vacuo and the residue crystallized from ethanol/ethyl acetate to give the product as a white crystalline solid (2.2 g.) M.P. 240°.

(c) 1,1¹ - azobis[3 - methyl - 2 - phenyl - 1H - imidazo-(1,2-a)pyridinium]dibromide.—The amino quaternary compound (2.0 g.) was dissolved in warm water (50 ml.) and added rapidly to a vigorously stirred solution of bromine (3 ml.) in ice/water (250 ml.). After stirring for 20 mins. benzene (100 ml.) was added and after a further 20 mins. the orange solid was filtered off. This was immediately stirred and heated at reflux in acetone (200 ml.). The pale yellow solid was filtered off, dried and crystallized from methanol/ethyl acetate to give the product as a yellow solid (1.2 g.) M.P. 218–220°.

EXAMPLE 5

1,1¹-azobis[3-bromo-2-phenyl-1H-imidazo[1,2-a]pyridinium]dibromide (a) 1-amino-3-bromo-2-phenylimidazo[1,2-a]pyridinium bromide.—A solution of the N-amino compound from Example 2(b) (0.25 g.) in water (20 ml.) at 5° was treated with saturated bromine water (29 ml.).

The precipitated solid was filtered off and boiled with acetone and the *dibromide* as in Example 2 (0.14 g.) filtered off. Evaporation of the filtrate under reduced pressure and at room temperature followed by treatment of the residue with methanol-ether gave the *bromocompound* (0.023 g.) which crystallized from water as colourless needles, M.P. 236° (decomp).

(b) 1,1¹-azobis[3 - bromo - 2 - phenylimidazo[1,2-a] dibromide.—A solution of the bromide (0.15 g.) in warm (35°) water (3 ml.) was treated with saturated bromine water (16.5 ml.). The reaction mixture was gently stirred until the precipitate coagulated when the orange solid was filtered off, washed once with water and then boiled in acetone until the solid became pale yellow. The filtered *dibromide* (0.12 g.) crystalized from methanol-ether as yellow prisms, M.P. 220°. The dipicrate crystallized from nitromethane and had M.P. 175–178° (decomp.).

1,1¹-abobis[3 - bromo - 2 - phenyl - 1H - imidazo[1,2-a] pyridinium]dibromide may also be prepared as follows:

(a) 1 - amino - 3 - bromo - 2 - phenylimidazo(1,2-a) pyridinium bromide.—1 - amino - 2 - phenylimidazo (1,2a)pyridinium bromide (14.5 g.) was stirred in methanol (100 ml.) and bromine (6 ml.) was added rapidly. A yellow solid precipitated. This was filtered off and washed with methanol. This crude perbromide was immediately heated at reflux in acetone (500 ml.) when a clear solution was obtained. The acetone solution was evaporated in vacuo and the residue crystallized from methanol/ethyl acetate to give the required product (9.8 g.), M.P. 236°.

(b) 1,1¹-azobis[3 - bromo - 2 - phenyl - 1H - imidazo (1,2-a)pyridinium]dichloride.—1 - amino - 3 - bromo-2-phenylimidazo(1,2-a)pyridinium bromide (9.8 g.) was dissolved in hot water (200 ml.) and added rapidly to a vigorously stirred solution of bromine (14 ml.) in ice/water (1200 ml.) After 30 minutes a mixture of benzene (200 ml.) and petroleum ether (B.P. 60–80°) (50 ml.) was added. After a further 30 minutes the solid was filtered off. This orange solid was immediately heated at reflux in acetone (200 ml.) and the bright yellow solid was filtered off and dried to give the dibromide of the product (7.0 g.).

The crude dibromide (3.7 g.) was suspended and stirred in water (40 ml.) and silver acetate (1.7 g.) was added. After ca. 30 minutes the silver bromide was removed by filtration and an excess of hydrochloric acid was added. The small amount of silver chloride was filtered off and the clear solution was evaporated in vacuo. The solid residue was crystallised from methanol/ethyl acetate to give the required dichloride (2.5 g.), M.P. 230° (decomp.).

EXAMPLE 6

1,1¹-azobis[2-(p-bromophenyl)-1H-imidazo[1,2-a] pyridinium]dibromide (a) 2 - (2 - acetylhydrazino) - 1 - (bromophenacyl) pyridinium bromide.—A solution of 2-(2-acetylhydrazino) pyridine (0.45 g.) and p-bromophenacyl bromide (0.83 g.) in acetone (8 ml.) was boiled under reflux for 2.5 h., the reaction mixture cooled and the product (0.7 g.) filtered off. Recrystallization from ethanol-ether gave the colourless *bromide*, M.P. 202–203°.

(b) 1 - amino - 2 - (p - bromophenyl)imidazo[1,2-a] pyridinium bromide.—A solution of the quaternary salt (0.7 g.) in 24% hydrobromic acid (8 ml.) was boiled under reflux for 1 h., the reaction mixture cooled and the product (0.59 g.) filtered off. Recrystallization from ethanol gave the colourless *bromide* as the monohydrate, M.P. 238–239°.

(c) 1,1¹ - azobis - 2 - (p - bromophenyl - 1H - imidazo [1,2-a]pyridinium dibromide.—A warm (50°) solution of the N-amino compound (0.6 g.) in water was treated with saturated bromine water (6 ml.) The precipitated orange solid was filtered off and boiled with acetone until it became pale yellow in colour. The yellow *dibromide* (0.46 g.) was filtered off and after recrystallization from methanol-ethanol had M.P. 206–207°. The *dipicrate* crystallized from nitromethane as yellow prisms, M.P. 200–201° (decomp.).

EXAMPLE 7

1,1¹ - azobis[2-methyl-3-phenyl-1H-imidazo[1,2-a] pyridinium]dibromide (a) 2 - (2 - acetylhydrazino) - 1 - (2 - oxo - 1 - phenylpropyl)pyridinium bromide.—A solution of 2-(2-acetylhydrazino) pyridine (1.55 g.) and the appropriate bromoketone (2.74 g.) in acetone (20 ml.) was boiled under reflux for 18 h. The reaction mixture was cooled, the white solid filtered off and washed with acetone. Recrystallization of the solid from ethanol-ether gave the colourless *bromide*, M.P. 186–188° (2.4 g.).

(b) 1 - amino - 2 - methyl - 3 - phenylimidazo[1,2-a] pyridinium bromide.—A solution of the quaternary salt (2.04 g.) in 24% hydrobromic acid (10 ml.) was boiled under reflux for 1 h. The solution was evaporated under reduced pressure and the residue crystallized from ethanol-ether giving the colourless *bromide*, M.P. 175–176° (0.43 g.).

(c) 1,1¹ - azobis[2 - methyl - 3 - phenyl - 1H - imidazo [1,2-a]pyridinium dibromide.—A warm (50°) solution of the N-amino compound (0.74 g.) in water (23 ml.) was treated with saturated bromine water (93 ml.). The precipitated red solid was filtered off and boiled with acetone until the suspended solid became pale yellow. The yellow solid was filtered off and recrystallised from methanol-ether giving the yellow *dibromide*, M.P. 240° (decomp.) (0.4 g.).

EXAMPLE 8

1,1¹-azobis[2,3-diphenyl-1H-imidazo[1,2-a]pyridinium] dibromide (a) 2-(2 - acetylhydrazino) - 1 - (α - phenylphenacyl) pyridinium bromide.—A solution of 2 - (2 - acetylhydrazino)pyridine (1.64 g.) and α-phenylphenacyl bromide (3 g.) in acetone (30 ml.) was boiled under reflux for 50 h. The cooled reaction mixture was treated with ether and the precipitated solid filtered off. Crystallization of the solid from aqueous acetone gave the *bromide* (0.85 g.) which recrystallized from water as colourless prisms, M.P. 175–176°.

(b) 1 - amino - 2,3-diphenylimidazo[1,2-a]pyridinium bromide.—A solution of the quaternary salt (0.8 g.) in 24% hydrobromic acid (10 ml.) was boiled under reflux for 1 hr. The solution was then evaporated under reduced pressure and the residue crystallized from methanol-ether giving the yellow *bromide* (0.515 g.), M.P. 240–245° (decomp.).

(c) 1,1¹-azobis[2,3-diphenyl - 1H-imidazo[1,2-a]pyridinium]dibromide.—A warm (60°) solution of the N-amino compound (0.06 g.) in water (2 ml.) was treated with saturated bromine water (2 ml.), the precipitated red solid was filtered off and boiled with acetone until the solid became yellow. The yellow solid (0.05 g.) was filtered off and recrystallised from methanol-ether giving the *dibromide* as the yellow mono-hydrate, M.P. 209–210°.

EXAMPLE 9

1,1¹-azobis[5,6,7,8-tetrahydro-2-phenyl-1H-imidazo [1,2-a]pyridinium dibromide (a) 1-amino-5,6,7,8-tetrahydro-2-phenylimidazo[1,2-a] pyridinium bromide.—A solution of the N-amino compound of Example 2(b) (0.145 g.) in methanol (10 ml.) was hydrogenated over Adams catalyst at atmospheric temperature and pressure until the uptake of hydrogen ceased. The catalyst was filtered off, the solvent evaporated under reduced pressure and the residue crystallized from ethanol-ether giving the colourless *bromide* as the monohydrate, M.P. 156–159° (0.63 g.). The *picrate* crystallized from ethanol and had M.P. 133°.

(b) 1,1¹-azobis[5,6,7,8-tetrahydro-2-phenyl-1H-imidazo[1,2-a]pyridinium]dibromide.—A solution of the N-amino compound (0.06 g.) in water (5 ml.) was treated with saturated bromine water (15 ml.) and the precipitated red solid filtered off. The red solid was then boiled in acetone until the suspended solid became pale green. Filtration gave the *dibromide* (0.021 g.) which recrystallised from ethanol-ether as yellow prisms of the dihydrate which decolourised at 179–183° and melted at 259–262°¹. The *dipicrate* crystallized from nitromethane as yellow prisms, M.P. 219°.

EXAMPLE 10

1,1¹-azobis[2,3-dimethylbenzimidazolium]dibromide (a) 1-acetamido-2,3-dimethylbenzimidazolium iodide.—A solution of 1-acetamido-2-methylbenzimidazole (1.57 g.) in methyl iodide (10 ml.) was boiled under reflux for 24 h. Dry ether was then added to the cooled reaction mixture and the precipitated solid filtered off and recrystallized from ethanol-ether giving the *iodide*, M.P. 241.5–243°.

(b) 1-amino-2,3-dimethylbenzimidazolium bromide.—A solution of the iodide in 24% hydrobromic acid (20 ml.) was boiled under reflux for 1 h. The solution was then evaporated under reduced pressure and the residue crystallized from ethanol-ether giving the *bromide* monohydrate, M.P. 217° (0.51 g.).

(c) 1,1¹-azobis - 2,3 - dimethylbenzimidazolium dibromide.—A saturated aqueous solution of the bromide (0.55 g.) was treated with saturated bromide water (64 ml.) and the precipitated red oil triturated until solid. The red solid was filtered off and boiled with absolute acetone (20 ml.) and the resulting yellow solid filtered off. Recrystallization from 48% hydrobromic acid-acetone gave the *dibromide* hemihydrate, M.P. 239° (0.27 g.).

EXAMPLE 11

1,1¹-azobis[3-methyl-2,5-diphenylimidazolium] dibromide (a) 1-acetyl-2-benzimidoyl hydrazine.—A solution of ethyl benzimidate hydrochloride (0.9 g.) in absolute alcohol (7.5 ml.) and triethylamine (0.7 ml.) was stirred at room temperature for 2 min. Dry 2-acetylhydrazine (0.36 g.) was then added and the solution stirred for 48 h. The solution was then cooled in ice and the solid filtered off. Recrystallization from aqueous ethanol gave the colourless base, M.P. 168° (0.54 g.). The *picrate* crystallized from nitromethane and had M.P. 156–158°.

(b) N-(2,5-diphenylimidazo-1-yl)acetamide.—A mixture of the base (0.4 g.) and phenacyl bromide (0.225 g.) was dissolved in the minimum volume of boiling acetonitrile and the solution boiled under reflux for 2 h. The reaction mixture was then cooled in ice and ether added. The precipitated solid was filtered off and crystallized from ethanol ether giving 1-acetyl-2-benzimidoylhydrazine hydrobromide as white prisms, M.P. 204° (0.18 g.). The filtrate remaining after the removal of the hydrobromide was evaporated to dryness under reduced pressure and the residual oil dissolved in benzene. Petroleum ether (60–80°) was added and the solution cooled. The separating solid was recrystallized from ethanol-benzene-petroleum ether (60–80°) giving the imidazole as white prisms (0.21 g.) which melted at 93.5–97° resolidified and finally melted at 183°.

(c) 1-amino-2,5-diphenylimidazole.—A solution of the acetamido compound (0.07 g.) in 24% hydrobromic acid (5 ml.) was boiled under reflux for 1.5 h. The solution was then evaporated under reduced pressure and the resulting white solid dissolved in water, basified with 2 N sodium hydroxide and the precipitated solid filtered ¹ The bromide thermally decomposes at 179–183° to form the hydrobromide of 5,6,7,8-tetrahydro-2-phenylimidazo[1,2-a]pyridine, M.P. 270–273°.

off. Recrystallization from aqueous ethanol gave the N-amino compound, M.P. 163°.

(d) 1-amino-3-methyl - 2,5 - diphenylimidazolium bromide.—A solution of the N-amino compound (0.1 g.) in a mixture of methyl iodide (5 ml.) and methanol (2 ml.) was boiled under reflux for 18 h. The solution was cooled and dry ether added. The precipitated gum was separated and triturated with ether until solid. Recrystallization from ethanol-ether gave the methiodide as pale yellow prisms, M.P. 188–189° (decomp) (0.13 g.). The methobromide obtained by ion exchange on Amberlite IRA400 (Br) crystallized from methanol-ether as colourless prisms, M.P. 162.5°. The methopicrate crystallized from nitromethane-ether as yellow prisms, M.P. 159°.

(e) 1,1¹-azobis[3-methyl-2,5 - diphenylimidazolium]dibromide.—A solution of the bromide (0.06 g.) in the minimum volume of water was treated with saturated bromine water (10 ml.). The precipitated red oil was triturated until solid, filtered off and boiled in absolute acetone (10 ml.). A further 10 ml. of acetone was added and the solution boiled again for a further 2 min. The solution was cooled as the tetrazene (0.03 g.) filtered off and recrystallized from methanol ether giving yellow prisms, M.P. 199–201°. The dipicrate crystallized from intromethane-ether as yellow prisms, M.P. 215–216°.

EXAMPLE 12

An injectable solution is as follows:

| | Percent w./v. |
|---|---|
| Active ingredient (compound of Example 4) | 2.72 |
| Sodium chloride | 0.63 |
| Water for injections | To 100 |

What is claimed is:

1. A compound of the formula

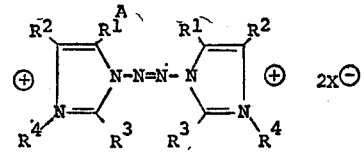

wherein:

R¹ and R², which are the same or different, are each hydrogen, lower alkyl, halogen, phenyl, phenyl substituted by halogen, phenyl substituted by hydroxy, phenyl substituted by lower alkoxy, substituted by trifluoromethyl; phenyl substituted by nitro; or together with the adjacent carbon atoms to which they are attached form phenyl;

R³ and R⁴, which are the same or different, are each lower alkyl or phenyl, or together with the adjacent nitrogen atom form pyridinium or tetrahydropyridinium; and X is a physiologically acceptable anion.

2. A compound as claimed in claim 1 in which R¹ and R² represent hydrogen, alkyl containing 1–3 carbon atoms, halogen, phenyl or halophenyl and R³ and R⁴ together with the atoms of the imidazole ring form pyridinium or tetrahydropyridinium.

3. The compound as claimed in claim 1 which is 1,1¹-azobis[1H-imidazo[1,2-a]pyridinium]dibromide.

4. The compound as claimed in claim 1 which is 1,1¹-azobis[2 - phenyl-1H - imidazo[1,2-a]pyridinium]dibromide.

5. The compound as claimed in claim 1 which is 1,1¹-azobis[3-bromo-2-methyl-1H - imidazo[1,2-a]pyridinium]dibromide.

6. The compound as claimed in claim 1 which is 1,1¹-azobis[3-methyl-2-phenyl - 1H - imidazo[1,2-a]pyridinium]dibromide.

7. The compound as claimed in claim 1 which is 1,1¹-azobis[3-bromo - 2-phenyl-1H-imidazo[1,2-a]pyridinium] dibromide.

8. The compound as claimed in claim 1 which is 1,1¹-azobis[2 - (p - bromophenyl) - 1H-imidazo[1,2-a]pyridinium]dibromide.

9. The compound as claimed in claim 1 which is 1,1¹-azobis[2-methyl - 3 - phenyl-1H-imidazo[1,2-a]pyridinium]dibromide.

10. The compound as claimed in claim 1 which is 1,1¹-azobis[2,3-diphenyl-1H - imidazo[1,2-a]pyridinium] dibromide.

11. The compound as claimed in claim 1 which is 1,1¹-azobis[5,6,7,8 - tetrahydro-2 - phenyl-1H - imidazo [1,2-a]pyridinium]dibromide.

12. The compound as claimed in claim 1 which is 1,1¹-azobis[2,3 - dimethylbenzimidazolium]dibromide.

13. The compound as claimed in claim 1 which is 1,1¹-azobis[3-methyl - 2,5 - diphenylimidazolium]dibromide.

References Cited

UNITED STATES PATENTS 3,409,606  11/1968  Lutz et al. _____ 260—157

OTHER REFERENCES

Kreutzberger, Chemical Abstracts, vol. 57, 5902–5903 (1962).

Giller et al., Index Chemicus, vol. 32, 108302 (1969).

Houben-Weyl, "Methoden der Organischen Chemie," vol. 10/2, pp. 828–830 (1967).

McBride et al., J. Am. Chem. Soc., vol. 79, pp. 572–576 (1957).

Overberger et al., J. Org. Chem., vol. 27, pp. 417–422 (1962).

FLOYD D. HIGEL, Primary Examiner

U.S. Cl. X.R.

260—293.78, 295 K, 296 L, 309, 561 H, 999; 424—226